United States Patent [19]
Williams

[11] Patent Number: 5,176,924
[45] Date of Patent: Jan. 5, 1993

[54] APPARATUS FOR PLASMA TREATMENT OF INTERIOR SURFACES OF HOLLOW PLASTIC OBJECTS

[75] Inventor: R. Lee Williams, Des Peres, Mo.

[73] Assignee: Lectro Engineering Co., St. Louis, Mo.

[21] Appl. No.: 716,825

[22] Filed: Jun. 17, 1991

[51] Int. Cl.[5] .................. B29C 35/08; B29C 33/00
[52] U.S. Cl. .................... 425/174; 118/723; 264/20; 264/83; 425/174.8 R
[58] Field of Search .............. 422/186.05; 264/83; 425/174.4, 174.8, 174.8, 174; 427/230; 118/723

[56] References Cited

U.S. PATENT DOCUMENTS 3,182,103 5/1965 Blaylock et al. ........ 425/174.8 E X
4,315,808 2/1982 Imada et al. .................... 264/83 X

FOREIGN PATENT DOCUMENTS

DD-271462-A 9/1989 German Democratic Rep. .

Primary Examiner—Brian E. Hearn
Assistant Examiner—Jonathan D. Baskin
Attorney, Agent, or Firm—Robbins & Robbins

[57] ABSTRACT

An apparatus and method are provided for surface treating the inside surfaces of hollow or three dimensional plastic objects. While the invention will be described with respect to plastic objects, it will be understood that other objects having a high dielectric strength, such as ceramics, cardboard, paper and wood, may be similarly treated. The surface treating is effected by selectively directing a high voltage plasma field to a selected interior surface of the object to enhance adhesion of various glues, inks and the like. The plasma field is generated in the interior of a tunnel directed into an opening of the hollow portion of the object to be treated. A specially designed electrode is supported from the opening to direct in a controlled manner the field to the selected interior area of the object to be treated. The electrode is supported from a high dielectric shield covering a central area of the opening to direct the plasma field around the shield to a laterally extending electrode below the shield. The electrode is supported from the shield by a conductive rod and is fashioned to extend in a spaced relation to the interior of the object to provide a proper energy level in the plasma to the area to be treated. A plurality of electrodes may be utilized to treat separate and selected interior areas of the object.

12 Claims, 2 Drawing Sheets

APPARATUS FOR PLASMA TREATMENT OF INTERIOR SURFACES OF HOLLOW PLASTIC OBJECTS

BACKGROUND OF THE INVENTION

It is well known that plastic surfaces such as various polyolefins have poor adhesion with other materials. The modification of plastic surfaces by electrical discharge to improve adhesion or decoration has had wide commercial use.

The use of specially designed electrical discharge equipment for surface treating plastics for a myriad of adhesives has been met with great success in the container, medical, toy and automotive industries.

The modification of plastic surfaces by various methods to improve adhesion has been in existence in the converting and packaging industry for some time, and has been gaining considerable acceptance in other industries, such as the automotive industry. Although there has been extensive research done on treated polymer surfaces, a basic understanding of the mechanism by which surface treatment improves adhesion is limited. The reason for this lack of understanding is that the surface treatment process affects only the upper few hundred angstroms of a polymer surface and chemical analysis is difficult. However, surface treatment as used in this invention is generally defined as the preparation of a plastic surface by exposure to an electrical field to effect oxidization or other molecular changes in order to allow maximum adhesion between itself and other materials such as glue, inks, coatings and the like.

Application of an electrical field to provide such surface treatment is well shown in Leach & Williams U.S. Pat. No. 3,428,801 and Williams U.S. Pat. Nos. 3,715,306 and 3,722,661. Such treatment may be carried out in a conveyor tunnel for continuous treatment of a series of plastic objects such as Williams U.S. Pat. No. 3,722,661.

While such surface treatment has proved effective for the treatment of exterior surfaces, it has proven to be a problem to effectively treat the interior surfaces of hollow plastic objects particularly in a continuous system employing a conveyor tunnel for treatment.

SUMMARY OF THE INVENTION

By means of this invention, there has been provided an electrode and method for use with high voltage low frequency plasma generating apparatus for surface treating of the interior surfaces of hollow or three dimensional plastic objects. The surface treatment is designed to raise the surface tension level of the hollow object to provide adequate adhesion with various glues of one kind or another, inks and decorative coatings or the like on the interior surfaces. While the invention will be described with respect to plastic objects, it will be understood that other objects having a high dielectric strength, such as ceramics, cardboard, paper and wood, may be similarly treated.

The plasma field is of the type that may be typically generated in the order of 250,000 volts and 60 cycle using conventional equipment for receiving the plastic objects, such as a tunnel in which the plasma field is obtained and a conveyor for moving the plastic objects through the tunnel for the treatment of a selected time period.

The surface treatment obtained by the invention is directed by a specially designed electrode against particular targeted interior areas such as an inner peripheral band or a plurality of bands spaced from one another, such that glue or adhesive applied to these areas will adhere and hold another object to be glued to the interior of the treated plastic object. When speaking of glue or adhesive, it will be understood that this generally includes decorative coatings, ink or the like.

The electrode of the invention is comprised of a highly conductive material such as copper and typically extends from a central area of the hollow object to close proximity to the interior surface to be treated. If a treated band is desired the electrode may be generally congruent with the interior of the plastic object. Where a plurality of correspondingly spaced electrodes may be employed a plurality of separated treated interior bands may be obtained.

In order to support the electrode and also to control and direct the plasma field to the interior of the hollow plastic object a support shield is employed. The shield is of a high dielectric capacity, and as an example, an acrylic shield may be employed which may be supported across an opening of the hollow plastic object while leaving openings between the shield and walls of the plastic object through which the plasma field may be directed in the form of a curtain or envelope into the hollow portion of the plastic object toward the electrode.

The shield also serves to support the electrode which is supported by a rod or the like extending from the bottom of the shield to the electrode. The rod is formed of a conductive material such as copper and further aids in directing the plasma field to the electrode which then serves to collect or concentrate the field against the selected interior surface to be treated. A plurality of electrodes may be employed by supporting them at selected positions on the support rod.

The electrode and invention of this invention are designed for employment with various types of plastic hollow objects to be surface treated such as boxes, spheres, containers, irregular shapes and the like since the electrode and support shield may be easily designed to be supported within the interior of the hollow object in the desired spaced relation. The electrode and support shield may be simply employed with high voltage low frequency plasma apparatus for the desired treatment with relative simplicity and efficiency.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWINGS

DESCRIPTION OF THE INVENTION

Figure 1:
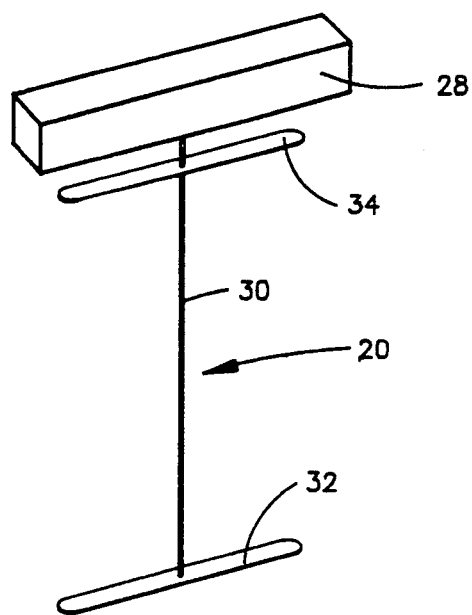
FIG. 1 is a pictorial view of the electrode and shield of this invention.

The plasma field used in this invention is designed to electrically treat the surface of three dimensional plastic objects as well as other objects having a high dielectric strength as previously noted. When using the term "plastic object" in a general sense, it will be understood that such other objects having a high dielectric strength, such as ceramics, cardboard, paper, wood and the like, may be included.

In the past the equipment was primarily used to treat blow molded containers. However, over the last few years, it has been found that it works equally well on injection molded, thermoformed and vacuum formed plastic parts. Unlike typical corona devices, the system does not use high frequency, so it is far safer for employees in a plant operation and close proximity to a treating electrode is not required. The equipment does not have the disadvantages that are experienced with flame treating such as shrinkage, warpage, dulling of high gloss finishes, and/or fire hazards due to open flame in the plant, and most importantly yields an even, consistent surface treatment to the plastic part. The system reaches a higher level of energy than all typical corona discharge devices. The equipment normally operates on an input electrical requirement of 240 volts, 60 cycle current which is transformed into high voltage and supplied to specially designed high voltage capacitor type plates in a treating tunnel such as shown in U.S. Pat. No. 3,484,363.

The equipment such as standard Lectro Treat 16" consists of a dielectric "tunnel" that the parts to be treated pass through. The capacitor plates are situated parallel and covered with a perforated polyethylene shield which tends to distribute the corona discharge evenly throughout the air gap, creating a corona or high voltage low frequency plasma. The surface of a plastic object passing between the capacitor plates is bombarded by charged particles creating a treated surface. The equipment normally has two sets of capacitor plates, (but can be used with one set of capacitor plates) one set mounted 90 degrees to the other for vertical and horizontal electron flow. This arrangement allows 360 degree treatment of the part passing through the treating area. Equipment with horizontal or vertical electrical discharge only, can and has been designed for many applications where the plastic part does not require 360 degree treatment. The equipment is in fact an alternating current device, which applies a series of positive and negative charges to the plastic part which is in the treating tunnel and as the part exits the treating tunnel it will be neutral. However, as plastic is a good dielectric material, and treating does slightly dry out the treated plastic surface, static charges can easily attach themselves again to the treated plastic.

Electrical operating parameters may be factory set for maximum operating efficiency. The only variable for treatment of the part is conveyor speed. Conveyor speed is variable so the surface treatment may be optimized for each particular situation. As the conveyor system is an integral part of the equipment, automation is easily achievable. The treating tunnel size can vary depending on the size, configuration, and production rates of the plastic parts to be treated.

There is described below a typical example employing the electrode of this invention.

EXAMPLE

Surface treatment by the electrode of this invention was applied to the interior wall surface and interior bottom of a battery case cell made of polypropylene sufficient so that adhesion will take place between an epoxy used to glue the cell and the interior bottom of the battery case. Further surface treatment was applied to the upper ½" of the inside of the battery cell case so that adhesion will take place between an epoxy used to glue the lid to the battery case in male and female relation.

Figure 3:
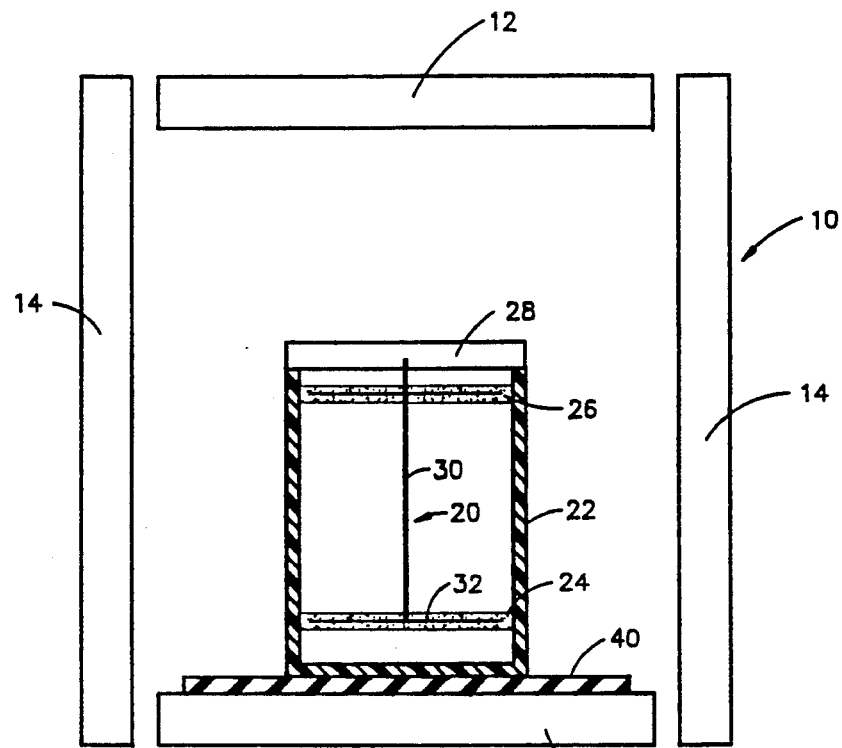
FIG. 3 is a pictorial view of a high voltage low frequency plasma tunnel within which the hollow plastic case is surface treated by the electrode.
Figure 4:
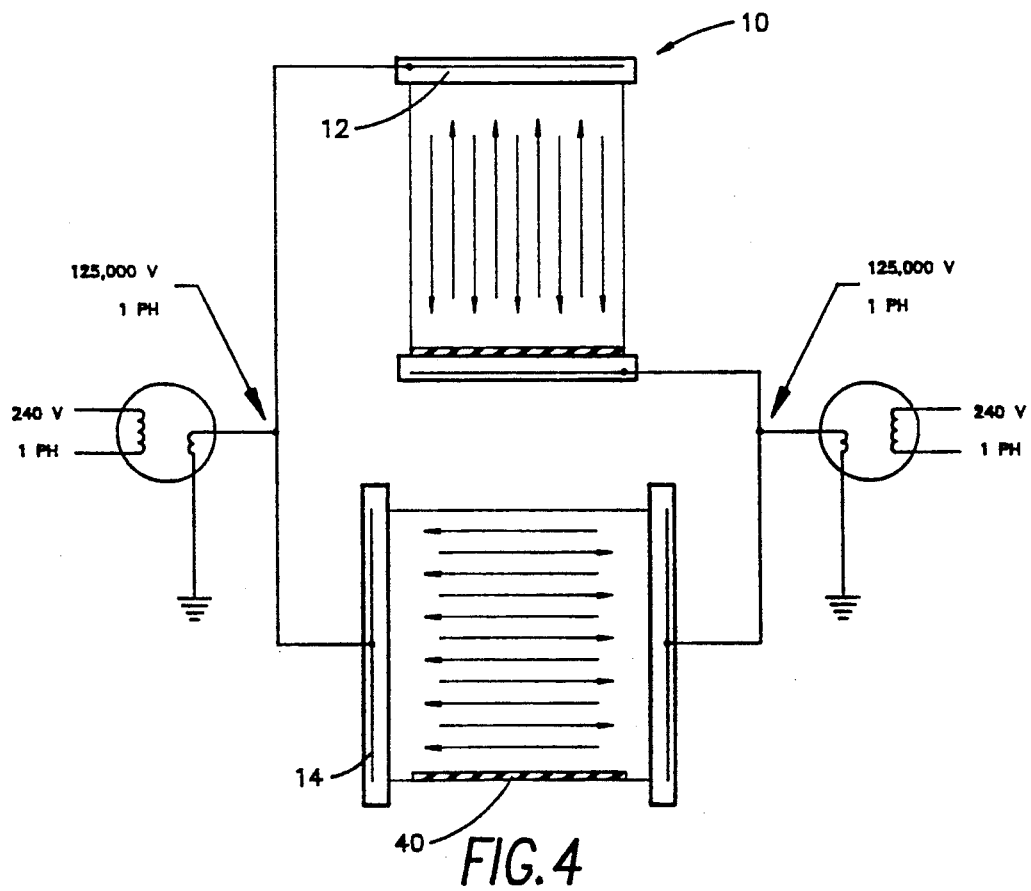
FIG. 4 is a pictorial view similar to FIG. 3 showing the application of the high voltage low frequency to the capacitor plates in the plasma tunnel.

A standard 16" Bulk Lectro-Treat manufactured by Lectro Engineering Co., St. Louis, MO, generally indicated by the reference numeral 10 in FIGS. 3 and 4 was used as a source of high voltage electrical plasma. This equipment provides both a vertical section and a horizontal section of directional, alternating electrical plasma in air. The electrical plasma is created by transforming 240 volts, single phase, 60 cycle electricity to 125,000 volts, single phase, 60 cycle electricity. This voltage is then supplied to capacitor type plates. Horizontal and vertical capacitor plates 12, and 14, respectively, are mounted 16" away from the other in the treating tunnel in the vertical or horizontal configuration.

High voltage supplied to each capacitor plate is of the opposite polarity so that when one capacitor plate is being supplied +125,000 volts on a particular cycle the other capacitor plate is being supplied with −125,000 volts. This set up creates a minimum of 250,000 volts potential across the 16" air gap between the capacitor plates. With the effects of voltage doubling done by the capacitor plates, the minimum plasma voltage in the treating tunnel is approximately 500,000 volts, single phase, 60 cycle. Under normal operation this high voltage plasma will surround and pass over a plastic object as it is passed through the treating tunnel, oxidizing (surface treating) the outside surface of the plastic object. The inside of the plastic object will not be surface treated due to the fact that high voltage will travel only on the surface of any object unless there is a conductor present to attract the high voltage somewhere else.

Figure 2:
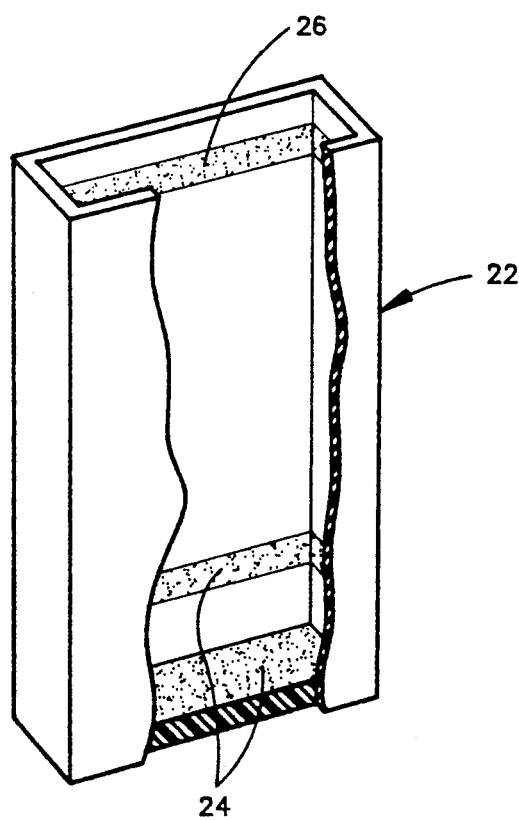
FIG. 2 is a pictorial view of a hollow plastic case with which the electrode and shield may be used.

An electrode 20 as shown in FIG. 1 was configured so that when a battery case 22 as shown in FIG. 2 was passed through the high voltage plasma, some of the high voltage plasma would be attracted to the electrode and create an electrical plasma inside the battery case to surface treat the inside bottom and top ½" of the battery case in the areas 24 and 26 as indicated.

A support and shield 28 was made out of cast acrylic for the electrode. The acrylic support was 1¼" wide by ⅜" thick and long enough to reach across the top of the battery case. Cast acrylic is used because of the unique dielectric capabilities and the high resistance to high voltage tracking. The acrylic support performs two functions, i.e., to suspend the horizontal electrode inside the battery case in the proper position so that a good electrical plasma would be generated in the areas that need surface treatment and to partially shield the electrode from the high voltage plasma so that a direct short in air from the capacitor plate to the electrode would not occur. However, a peripheral opening around the sides of the shield 28 into the battery case is provided for entry of a curtain or envelope of the plasma field to the electrode. The width and thickness of the acrylic support is critical for this reason.

The vertical portion of the electrode was made of a conductive support rod of 12 gauge copper magnet wire 30. A hole was drilled in the acrylic support ¼" deep and the wire was epoxied in to this hole. The length of the wire was determined by experimentation to have the best electrical plasma created in the interior bottom of the battery case. In this application the wire was 7¼" long so that the horizontal electrode 32 was suspended 1¼" above the bottom of the battery case when the electrode apparatus was placed in the battery case. The battery case was comprised of six cells, each measuring 6¼" long, 1⅞" wide and 8½" high with an electrode and shield employed for each cell.

The lower horizontal electrode 32 and an upper electrode 34 were made of 0.020 soft copper sheet and were ¼" wide and 5½" long, with the ends rounded with no sharp corners. The length and width of the horizontal electrodes are determined by the size of the inside area to be surface treated so that the optimum electrical plasma will emit from them to surface treat the areas needing treatment. It will be understood that the horizontal electrodes are not always rectangular. When the inside surface is square or round the electrode may or may not be shaped congruently. The thickness of the walls of the plastic to be treated must be taken into consideration as well as any "electrically weak areas" such as a corner. If the electrode is not sized and configured properly poor surface treatment will occur or a hole will be burned through the wall of the plastic part. The distance of the horizontal electrode from the surface to be treated can also cause the same problems.

Also as in the case of treating the inside of a battery case having a plurality of cells, multiple suspended electrodes must be used, one suspended inside each cell cavity. The distance between horizontal electrodes between cells is also critical and has to be taken into account so that electrical arcing does not occur between cell horizontal electrodes. This could result in burning through the wall of the battery cell.

USE

The electrode is placed in the battery case with the shield 28 supported upon the open top. The battery case with the electrode apparatus is then placed on the conveyor 40 of the plasma generating apparatus 10 with the conveyor moving at approximately four feet per minute. The speed of the conveyor is important in that the longer the object to be treated is in the electrical plasma, the higher the level of surface treatment achieved.

As the battery case 22 with electrode 20 passes in to the vertical discharge electrical plasma some of the electrical plasma is attracted to the conductive vertical wire portion 30 of the electrode apparatus. This electricity travels down the wire to the horizontal electrode 32 soldered on to the end of the wire. An electrical plasma is sprayed from the edges of the horizontal electrode toward the bottom of the battery case. The electrical plasma sprays out due to the relationship that underneath the battery case and underneath the conveyor the battery case is on, is a capacitor plate 12 at opposite potential from the electrical plasma from the electricity supplied to the electrode apparatus by the capacitor plate above the battery case and electrode. With the electrode being suspended close to the bottom the electrical plasma completely covers the bottom of the battery case and surface treats the interior bottom very effectively because it is strongly attracted to the opposite potential beneath the battery case. The electrical plasma is created rather than just an electrical arc because there is no "easy" path for this to occur, so the electricity spreads out or becomes a plasma trying to reach the opposite potential.

As the battery case with the electrode apparatus passes into the horizontal plasma discharge area of the apparatus 10 the same thing happens as above, only this time, because the electrical plasma is horizontal, the inside walls of the battery case are surface treated. In actual practice, the experimentation needed to design an electrode apparatus for a given inside treating project is fairly simple involving only routine trial and error until the best results of surface treatment are achieved.

Determination of surface treatment levels needed is dictated by the adhesive, ink, decorative coatings being used, i.e. epoxy, glue or the like. There are various methods of measuring surface treatment. The purpose of surface treatment is to increase the surface tension so that adhesion will occur when the adhesive is applied. Surface tension is normally measured in dynes per cm squared. This correlates to the energy necessary for a drop of liquid to flow out over the surface to be treated. The further the liquid spreads out, the higher the surface tension. There are also several tests used that are specified in ASTM Standards such as the aforementioned surface tension test in ASTM D-2578-67 and tape test in ASTM D-3359-87. In the latter an example would be to spray a given ink on the surface, apply a tape over the ink and pull the tape away. If the ink does not pull away from the surface then you would have good surface treatment.

Various changes and modifications may be made within this invention as will be apparent to those skilled in the art. Such changes and modifications are within the scope and teaching of this invention as defined in the claims appended hereto.

What is claimed is:

1. In an apparatus for surface treating objects having a high dielectric strength to improve adhesion characteristics which comprises means for creating a high voltage low frequency plasma field around said object, the improvement which comprises an electrode for surface treating the interior of hollow objects having a high dielectric strength by directing said plasma field against a selected interior surface of said object, said electrode being supported from an insulating shield supported about an opening of said object, said electrode extending toward and being in spaced relation to an interior surface of the object to be treated.

2. The apparatus of claim 1 in which said insulating shield is a plastic material having a high dielectric strength.

3. The apparatus of claim 1 in which said insulating shield is an acrylic plastic.

4. The apparatus of claim 1 in which said insulating shield covers a central portion of said opening and said spaced relation to the interior surface of the object provides a communication path for the plasma to the electrode.

5. The apparatus of claim 1 in which a plurality of electrodes are supported in spaced relation from one another, each of said electrodes extending toward a selected inside surface of the object to provide separately treated inside surfaces.

6. The apparatus of claim 1 in which said electrode extends laterally toward said surface and has a periphery spaced from the interior surface of said object and generally congruent with the surface to be treated.

7. The apparatus of claim 1 in which said electrode is supported from a lower portion of a conductive support rod extending from said support shield.

8. The apparatus of claim 7 in which said conductive support rod is constructed of copper.

9. The apparatus of claim 1 in which said electrode is in the form of a conductive plate having a peripheral edge uniformly spaced from the interior surface to be treated and extending generally congruent thereto.

10. The apparatus of claim 9 in which said electrode is supported from a lower portion of a support rod extending from said support shield and said conductive support rod and electrode are copper.

11. The apparatus of claim 10 in which a plurality of electrodes are supported in spaced relation from one another, each of said electrodes extending toward a selected inside surface of the object to provide separately treated inside surfaces.

12. The apparatus of claim 1 in which a tunnel is provided in which the plasma field is created, and a conveyor extends through the tunnel for supporting said plastic objects and said electrode and moving them through the tunnel while being subjected to said surface treatment for a selected period of time.

* * * * *

UNITED STATES PATENT AND TRADEMARK OFFICE
CERTIFICATE OF CORRECTION

PATENT NO. : 5,176,924
DATED : January 5, 1993
INVENTOR(S) : R. Lee Williams

It is certified that error appears in the above-indentified patent and that said Letters Patent is hereby corrected as shown below:

Column 7, line 13, claim 10, "conductive" should be inserted before "support Pod".

Column 8, line 15, claim 13, add "The apparatus of claim 1 in which the object is plastic.

Signed and Sealed this

Eighth Day of February, 1994

*Attest:*

BRUCE LEHMAN

*Attesting Officer*   *Commissioner of Patents and Trademarks*